United States Patent [19]
Shafé

[11] Patent Number: 5,590,006
[45] Date of Patent: Dec. 31, 1996

[54] ONE-SIDED, SINGLE PLATTER HARD DISK WITH CENTER PARKING FEATURES

[75] Inventor: Mathew K. Shafé, Campbell, Calif.

[73] Assignee: International Business Machines Corporation, Armonk, N.Y.

[21] Appl. No.: 363,463

[22] Filed: Dec. 23, 1994

[51] Int. Cl.⁶ ............................. G11B 5/54; G11B 21/22
[52] U.S. Cl. .................. 360/105; 360/97.01; 360/99.12
[58] Field of Search .......................... 360/97.01–98.01, 360/98.07, 98.08, 99.08, 99.12, 104–106; 369/266–271, 215, 219–221, 226

[56] References Cited

U.S. PATENT DOCUMENTS

| | | | |
|---|---|---|---|
| 4,561,035 | 12/1985 | McDorman et al. | 360/99.12 |
| 4,686,592 | 8/1987 | Carroll et al. | 360/97 |
| 4,764,831 | 8/1988 | Patel | 360/105 |
| 4,843,504 | 6/1989 | Barnes | 360/106 |
| 5,025,335 | 6/1991 | Stefansky | 360/97.01 |
| 5,072,320 | 12/1991 | Ezaki et al. | 360/97.01 |
| 5,124,863 | 6/1992 | Koizumi et al. | 360/99.08 |
| 5,231,549 | 7/1993 | Morehouse et al. | 360/75 |
| 5,241,436 | 8/1993 | Kawabata et al. | 360/97.01 |
| 5,251,082 | 10/1993 | Elliott et al. | 360/98.07 |
| 5,257,151 | 10/1993 | Cooper et al. | 360/98.07 |
| 5,291,355 | 3/1994 | Hatch et al. | 360/97.01 |
| 5,296,981 | 3/1994 | Ogawa | 360/99.08 |
| 5,313,350 | 5/1994 | Dion | 360/97.01 |
| 5,329,412 | 7/1994 | Stefansky | 360/97.01 |
| 5,345,367 | 9/1994 | Pierce et al. | 362/32 |

FOREIGN PATENT DOCUMENTS

| | | | |
|---|---|---|---|
| 1-248334 | 10/1989 | Japan | 369/282 |
| 5-135526 | 6/1993 | Japan | 360/105 |

OTHER PUBLICATIONS

Anonymous, "Head Parking Zone", Research Disclosure, Nov. 1988, No. 295, RD#29563.

R. Nass, "Improved Low–Power Modes Highlight 1.8–in. Drives", Electronic Design, Apr. 18, 1994, pp. 47–54.

U.S. patent application Ser. No. 08/363,462, "Electric Circuit Implementing Component Level Disk Drive".

U.S. patent application Ser. No. 08/363,464, "Reconfigurable Interface for Small Disk Drives".

*Primary Examiner*—Jefferson Evans
*Attorney, Agent, or Firm*—Ingrid M. Foerster

[57] ABSTRACT

A disk drive assembly according to the present invention comprises a disk with a single recording surface having a substantially planar region at its center, a motor assembly, and an actuator assembly including a single suspension supporting a transducer, wherein the transducer is parked at the center region of the disk. In a preferred embodiment, the disk is mounted directly to a flat motor. In an alternate embodiment, a motor hub or a stationary structure is provided at the center of the disk and is flush with the plane of the recording surface. The design of the present invention offers the advantage of a very low profile disk drive particularly suitable for applications such as card-type disk drives.

39 Claims, 9 Drawing Sheets

ONE-SIDED, SINGLE PLATTER HARD DISK WITH CENTER PARKING FEATURES

FIELD OF THE INVENTION

The present invention relates generally to disk storage devices and in particular to a single platter, single-sided disk drive having a low height profile and center parking features.

BACKGROUND OF THE INVENTION

Small form factor disk drives are growing in commercial importance as they assume the functions of larger, costlier, high performance direct access storage devices (DASD). As drive size continues to decrease, they are also becoming practical for a number of other applications requiring information storage. A small form factor disk drive generally includes one or more disks, each having a pair of recording surfaces for storing information. Information is accessed and retrieved from each recording surface with a transducer. The data capacity of the drive is determined by the number of recording surfaces available for user data, and the amount of data that can be stored on each data recording surface.

Two predominant and competing objectives in the development of disk drive technology have been to maximize data capacity, while minimizing drive dimensions for reduced space requirements. These interests must be balanced in new drive designs, since a reduction in size has a direct impact on data capacity. Ultimately, a particular application will determine which factor is to be given the highest priority.

A number of small form factor drives are currently available with disk diameters typically ranging from 5¼" to 1.3" in diameter. Many of these are available in enclosures meeting industry standard form factors and functional interface requirements to easily accommodate a variety of different applications. For example, IBM Corporation offers a 1.6" high 3½" form factor disk drive having two stacked disks, magnetoresistive heads enabling high areal densities, and a data capacity of 8.7–10.8 gigabits. Versions are available with industry standard SCSI (small computer system interface) and SSA (serial storage architecture). The product is suitable for applications requiring high data capacities, e.g. multimedia systems or array subsystems emulating larger high performance DASD. At the other end of the spectrum, Hewlett Packard's 1.3", 20–40MB, single-platter Kittyhawk drive targets applications with small storage requirements, such as the palmtop, fax machine, cellular phone and printer markets.

A variety of applications exist wherein drive height is a primary concert and data capacity is secondary. For example, an emerging industry standard is the credit card-sized PCMCIA type form factor established by the Personal Computer Memory Card Industry Association. The standard was introduced to encourage development of thin, multi-application memory cartridges compatible with PCMCIA-defined computer slots. It has therefore become an objective of a number of competing disk drive manufacturers to provide low profile disk drives meeting these form factor requirements. Three PCMCIA form factor types have presently been defined. Type III card measures 10.5 mm in height, 85.6 mm in length and 54 mm in width. The dimensions of a type II card are approximately 5 mm high×86 mm long×54 mm wide. A type I card is a modest 2.5 mm h×85.6 mm l×54 mm w.

Disk drives utilizing 1.8" disks or smaller may meet the length and width requirements of a PCMCIA type III card, but only one commercially available disk drive to date have met the rigid height limitations of the type II card, and none have been implemented for type I. Drive height is generally determined by the height of the motor and the actuator assemblies, and these heights, in turn, are determined by the number of data surfaces in the device to be accessed. Consequently, drive height can be minimized by providing a single disk with only one or two data surfaces. For applications requiring small disks (e.g. 1.8" or smaller), the data capacity attainable for a single sided disk had been impractical. However, recent developments in MR head technology have now made such designs feasible.

A single-platter, single-sided disk drive of any dimension offers a number of benefits. Already mentioned is the low profile height attained by limiting the actuator to a single suspension. Another benefit is that of center parking. Disk drives occasionally experience external shock forces during movement or operation, as discussed, for example, in an article entitled "Improved Low Power Modes Highlight 1.8-in. Drives". Richard Nass, Electronic Design, Apr. 18, 1994, pp. 47–54, p. 48. External shock may cause the sliders to slam into the data surfaces, resulting in damage to the disk or and the delicate read/write elements, as well as the loss of data. To avoid this risk, most disk drive designs employ a method for "parking" the suspension and head in a safe place during periods of inactivity.

U.S. Pat. No. 5,231,549 discloses a method for loading each head onto a ramp located at the outer diameter of the recording surface. A problem with this approach, however, is that the largest outer diameter data tracks are sacrificed to allow the overhang of the ramp. The design also requires either a slightly larger hard disk enclosure or special positioning of the actuator pivot to accommodate the ramp, making it less suitable for low profile form factors. In addition, the design requires a specially adapted suspension, e.g. a tab or load/unload rod appended to the suspension beam.

An alternative design provides a "landing zone", or region not used for data storage, at the inner diameter (ID) of the disk. For instance, U.S. Pat. Nos. 5,291,355 and 5,313,350 disclose single-platter disk drives equipped with a mechanical latching mechanism on the actuator for securing the heads at the innermost track of the disk. U.S. Pat. No. 5,291,355 describes the use of a magnetic field to capture the actuator arm and park the heads at the desired zone. Other applications provide a textured landing zone to minimize friction between the parked head and disk substrate. See, for example, anonymously submitted research disclosure "Head Parking Zone", RD29563 Nov. 1988 N. 295. Texturing reduces the amount of torque required to "unpark" the head, i.e. to break the slider free of the landing zone.

Parking at the ID is desirable because the data tracks are small, and loss of their use only minimally impacts a disk's data capacity. It would be even more desirable to park the head at the center of the disk, where tracks would be too small for practical use. Most disk drive designs preclude center parking, since a spindle hub occupies the center region. A single-sided disk could be designed with a hub flush with the plane of the data surface and suitable to center-parking. Alternatively, the single platter could be mounted directly to a flat motor, eliminating the need for a hub. In either implementation, a structure may be provided at the disk center or on the drive enclosure above the disk's center to facilitate parking, e.g. a load/unload ramp structure.

An implementation of a single-sided disk drive wherein the platter is mounted directly to a flat motor offers the additional advantages of reduced motor height and increased motor efficiency. The motor may have a diameter limited only by the dimensions of the disk itself, providing the greatest torque at the smallest motor height.

SUMMARY OF THE INVENTION

A primary object of the present invention is to provide storage for applications requiring very low profile disk drives.

Another object of the present invention is to provide a low profile, small form factor disk drive suitable for use in a PCMCIA type II card, preferably with a footprint of less than 50% of the card area.

A further object of the present invention is to provide a single-sided disk drive with center parking features for improved shock resistance.

Yet another object of the present invention is to provide a disk drive with a thin, flat motor for reduced power consumption.

Accordingly, the present invention is a disk drive assembly including a single disk having one recording surface, a motor for rotating the disk, an actuator assembly including a single suspension carrying at least one transducer for writing and retrieving data from the disk, and a parking zone at the center of the recording surface. In a preferred embodiment, a 1.3-inch disk is mounted directly to a flat motor for reduced power consumption, providing a planar, unused region at the center of the recording surface for the parking zone. An alternative embodiment includes a rotating hub in plane with the disk recording surface. In a third embodiment, a stationary hub independent of the motor is provided in plane with the recording surface. Extensions of each of these embodiments include parking and/or support structures provided at the disk center or suspended from the drive housing immediately above the disk center.

BRIEF DESCRIPTION OF THE DRAWING

The foregoing and other objects, features and advantages of the present invention will be apparent from the following detailed description of the preferred embodiments of the invention, and from the accompanying figures of the drawing.

DESCRIPTION OF THE PREFERRED EMBODIMENT

Figure 1A:
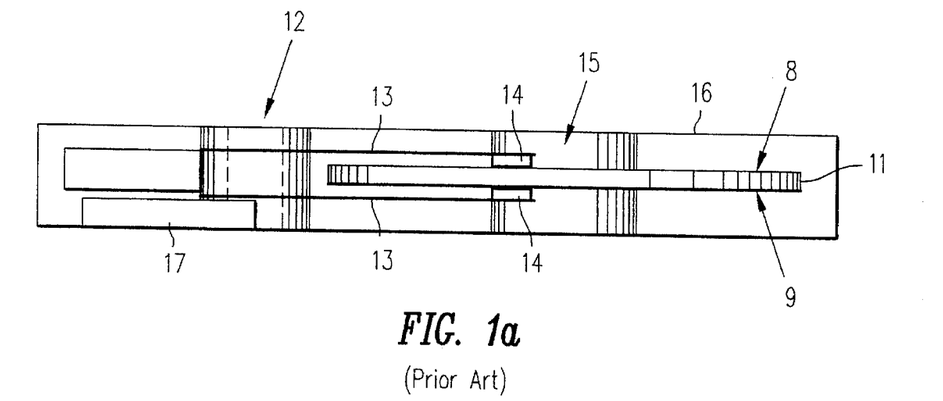
FIGS. 1A and 1B show a known disk drive including two recording surfaces and two suspensions.
Figure 1B:
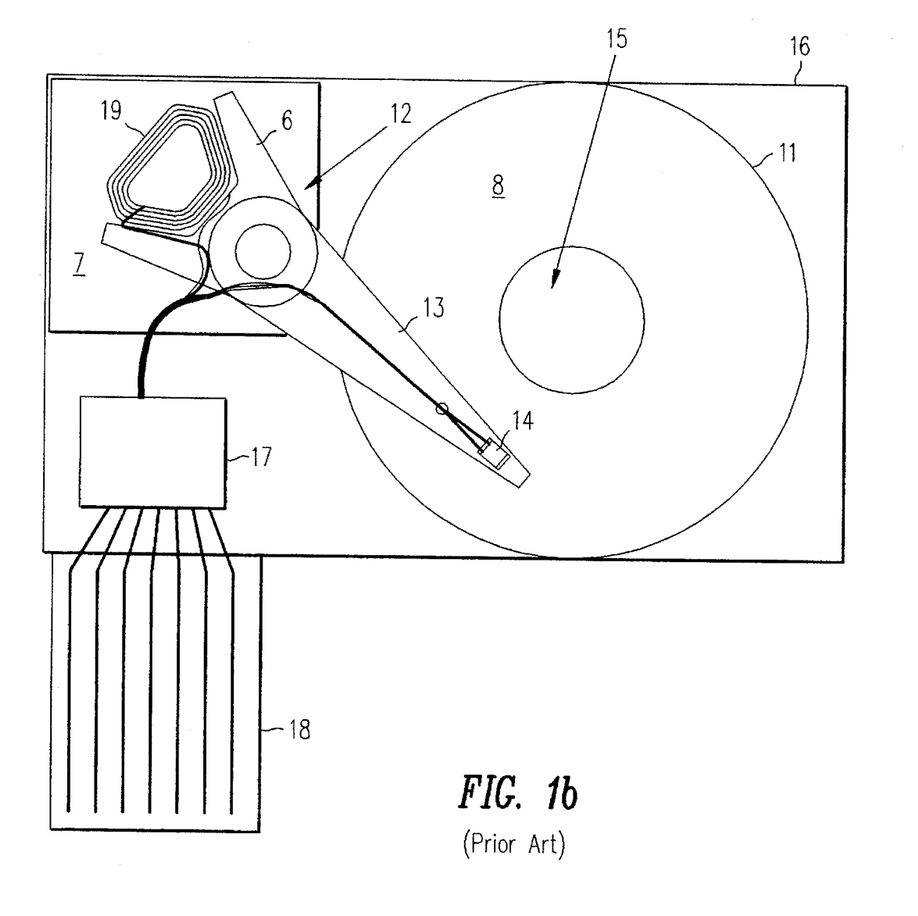

FIGS. 1A and 1B are illustrations of a known disk drive comprising a single disk or platter 11 connected to a hub 15, a motor (not shown), an actuator assembly 12, arm electronics 17, and a housing 16. The disk 11 includes two recording surfaces 8,9.

As is known in the art, the actuator assembly 12 generally comprises a voice coil motor (VCM), an actuator arm 6, and a pair of suspensions 13 connected to the arm 6 and supporting a pair of air bearing sliders 14 over respective recording surfaces 8,9 of the disk 11. One or more transducers or read/write heads are located on each slider 14, and are held in close proximity to the disk surface by the combination of a downward force (relative to the disk surface) from the suspension 13 and an upward force caused by air flow generated from the rotation of the disk 11. If the downward force exceeds the upward force, the slider will come into contact with the disk surface.

The VCM is the moving mechanism of the actuator assembly and comprises an inductive coil 19 disposed between an upper magnet (not shown) and a lower magnetic plate 7. The arm electronics 17 transmits electrical positioning current to the coil 19. The signals induce a changing magnetic flux for repulsing and attracting the magnet and magnetic plate 7. The repulsing and attracting forces provide movement of the actuator arm in a plane parallel to the disk surface, causing the suspensions 13 to move along an arcuate path.

Data is generally recorded on concentric tracks of the recording surfaces 8,9. The disk region or track having the largest diameter is referred to as the outer diameter (OD) of the disk, and the region or track nearest to the hub and having the smallest diameter is referred to as the inner diameter (ID). Data to be stored on the disk 11 is first "encoded" by a read/write channel (not shown) residing within or external to the disk drive housing 16. The data is encoded into a form suitable for the storage medium, then transmitted via the arm electronics 17 to the transducer for writing to the disk. For example, in a magnetic disk drive, digital data is encoded into a series of pulses. As is known in the art, the pulses are transmitted in the form of a current to the transducer, and cause a fluctuating magnetic field at the transducer pole tip that affects the magnetization of discrete regions on the disk surface. When a transducer senses or "reads" information from the disk, the data is transmitted in encoded form via the arm electronics 17 to the channel for "decoding". The arm electronics usually include means for amplifying and synchronizing the read signal.

The hub 15 is fixedly attached to the disk 11 and encases a motor (not shown) for providing a rotational force. The rotational force is translated to the hub 15 and from the hub 15 to the disk 11. The hub generally protrudes from the upper surface of the disk as shown in FIG. 1A, preventing the suspension/head assembly from access to the region at the center of the disk.

Figure 2:
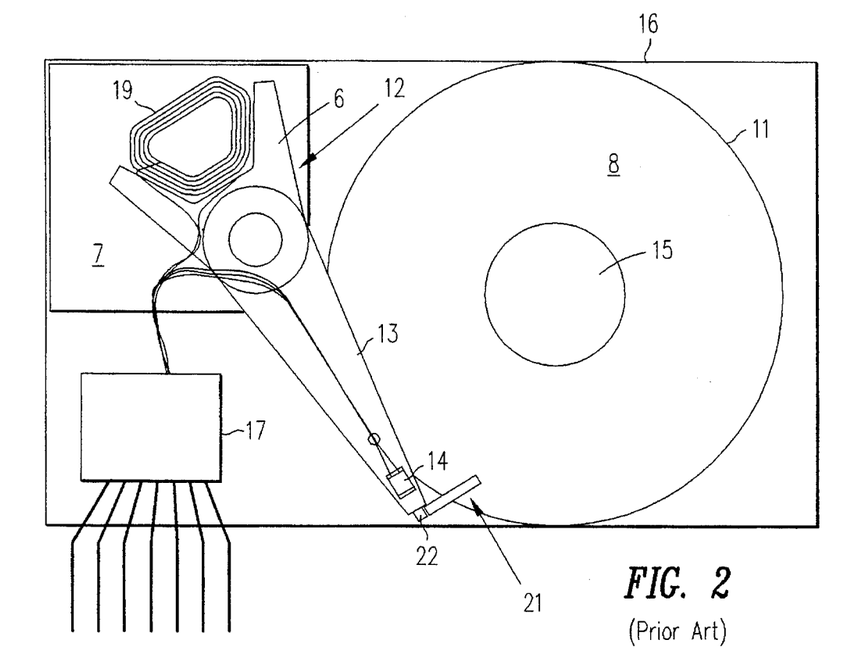
FIG. 2 shows a known disk drive having an outer load/unload ramp for head parking.

To protect a rotary disk drive from external forces during operation or movement, means may be implemented to park the head when the disk is not operating and/or during periods of inactivity (i.e. times when data is not being written to or retrieved from the disk). FIG. 2 shows a disk drive may include a presently known load/unload ramp 21 at the outer diameter of the disk 11, as discussed previously. During periods of inactivity, the actuator assembly 12 moves the suspension 13 toward the outer diameter and onto the ramp 21, where it remains "parked" until further disk access is required. While on the ramp 21, the slider 14 is protected from slamming into the disk, protecting the slider 14, head and disk 11 from permanent damage. The suspension 13 is usually adapted in some manner to engage the ramp 21, e.g. it may include a special tab 22, as shown, or a rod extended from the portion of the suspension nearest to the actuator arm 6.

Figure 3:
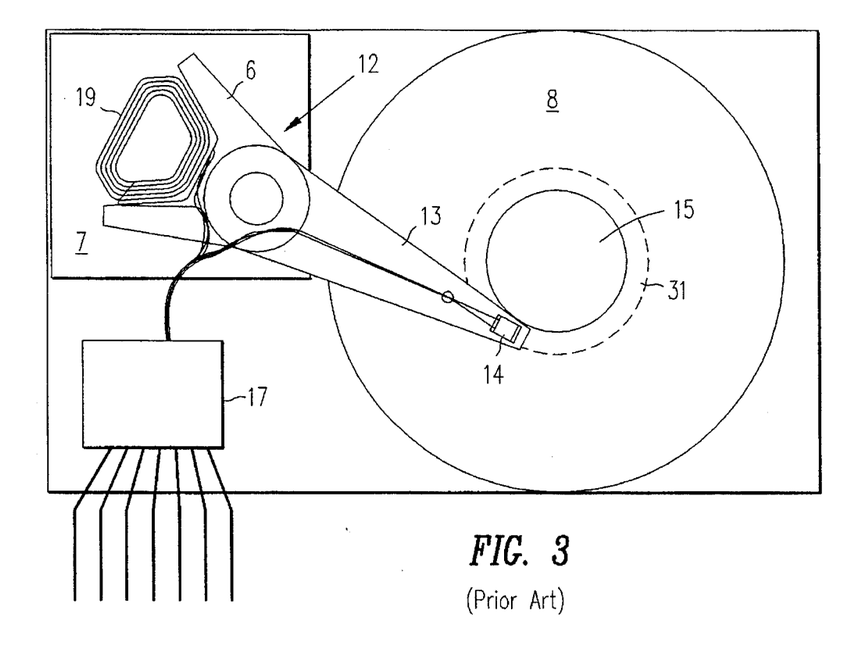
FIG. 3 is a known disk drive with a parking zone at the inner diameter.

FIG. 3 illustrates an alternative known parking scheme wherein a region is reserved at the inner diameter of the disk proximate to the hub 15. During periods of activity, the suspension moves toward the inner diameter of the disk 11. The upward force of the airflow lessens approaching the ID and is eventually overcome by a combination of the downward force of the suspension 13 and an attractive force between the slider 14 and the disk surface 8. The slider is parked on the disk surface within this "landing zone" 31. To "unpark" the slider, the drive motor must provide sufficient force to overcome "stiction", i.e. the attractive and frictional forces between slider 14 and surface 8. It is greatest at the outer diameter of the disk and decreases in the direction of the disk center, being essentially reduced to zero at dead center. Stiction is minimized by locating the parking zone 31 as close to the center of the disk as possible. Note that the protrusion of hub 15 will define the inner limit of this zone 31. Stiction may be further reduced by roughening the surface of the parking zone 31, e.g. by forming concentric grooves that provide fewer points of contact between the slider 14 and surface 8 than a smooth surface.

FIGS. 4A–4D show the preferred embodiment of the disk drive assembly according to the present invention. The drive comprises a disk 11, a motor 44, an actuator assembly 12, arm electronics 17, and a housing 16. The disk 11 is preferably magnetic and includes one recording surface 42. It is mounted directly to a flat motor 44 along its nonrecording surface by some appropriate means, e.g. mechanically, or by applying a bonding agent along interface 43. The disk either does not include a center hole or has a very small hole at disk center in this embodiment. Direct platter mounting eliminates the need for a hub, allowing a wider, thinner motor assembly than would be appropriate for rotating a disk with two recording surfaces. In fact, the diameter of the motor 44 is only limited by the diameter of the disk 11 itself. The advantages of this type of motor 44 will be described in further detail below. Elimination of the hub offers the additional advantages of a lower disk height, a reduced number of drive components and the possibility of integrating the magnetic disk into the motor bearing assembly itself, thereby simplifying the assembly process.

The actuator assembly comprises a voice coil motor, an actuator arm 6, a single suspension 13 and a transducer-bearing slider 14. Preferably, the slider carries a magnetoresistive (MR) head for greater data capacity. Magnetoresistive heads are known in the disk drive industry and are preferred because their high sensitivity enables greater areal density (i.e. bits per inch) than conventional inductive heads.

Using a state of the art magnetoresistive head in the preferred embodiment provides useful data storage capacity for applications requiring moderate data storage. However, it will be understood that an inductive head may also be used in the present invention. Moreover, the invention may easily be adapted for a plurality of heads per slider and a plurality of sliders on suspension 13. The actuator assembly 12 preferably has a low profile height since it only has to access a single disk surface 8.

Figure 4A:
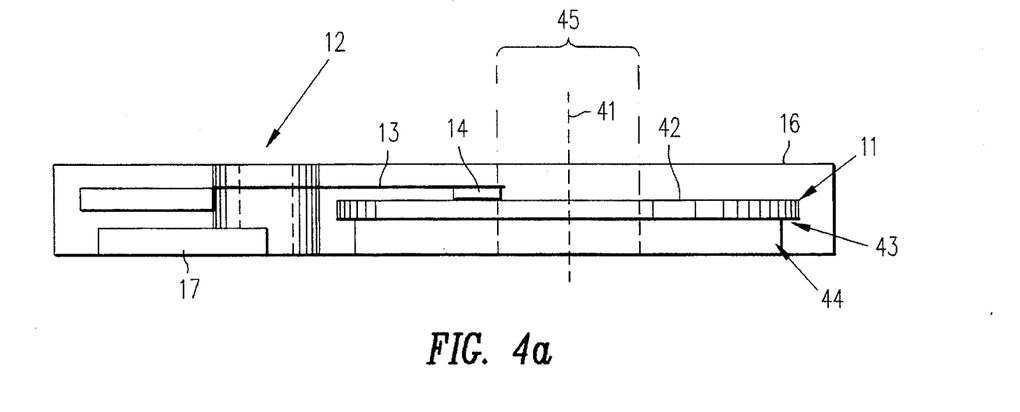
FIGS. 4A–4D show side and top views of the disk drive according to the present invention having no inner diameter hole and center parking.
Figure 4B:
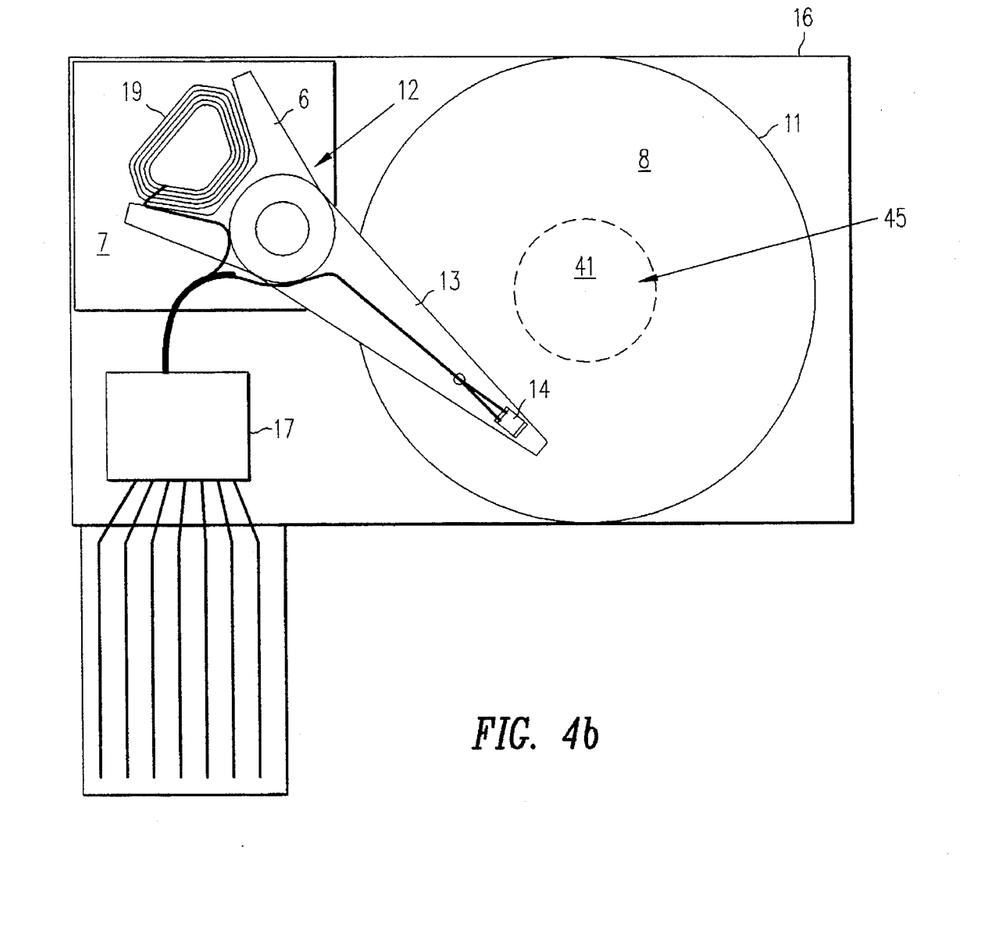
Figure 4C:
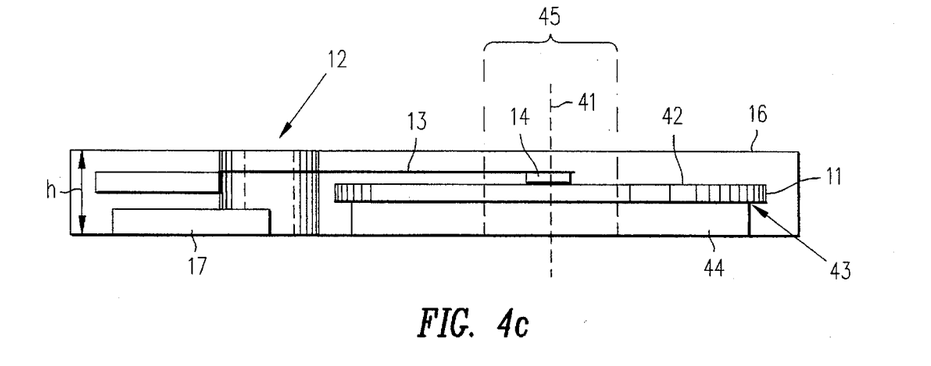
Figure 4D:
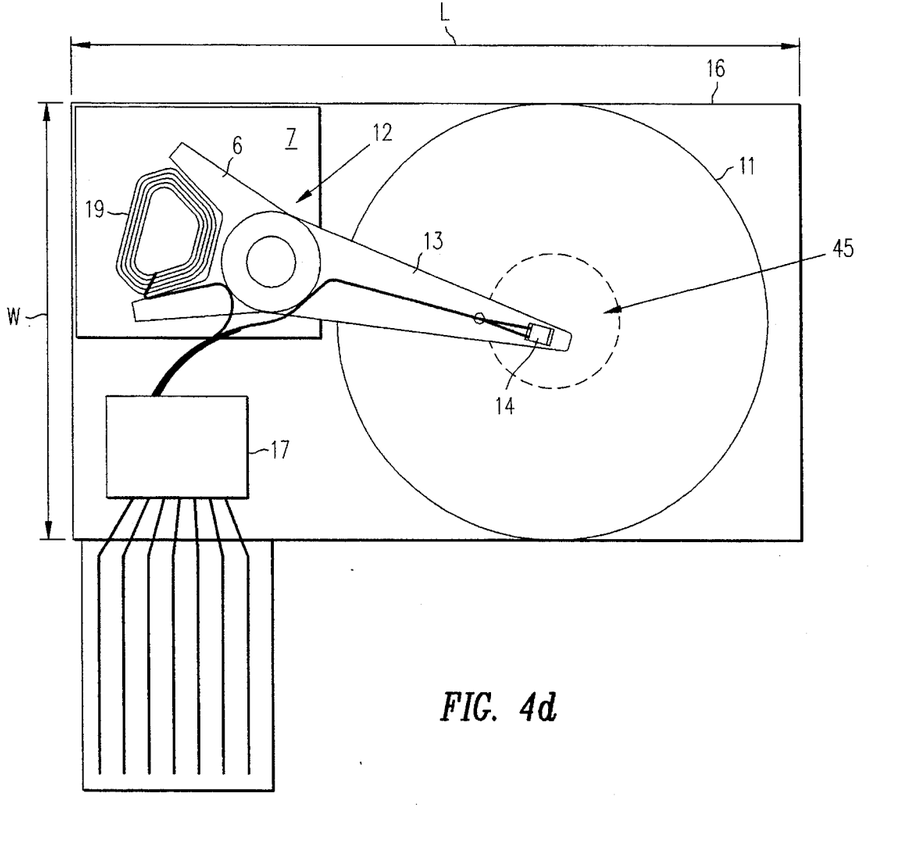

Direct mounting of disk 11 to motor 44 creates an unobstructed region 45 at the disk's center 41 accessible to the actuator assembly 12. The diameter of recording tracks in this region would be too small for practical use, so the region is used for center parking. FIGS. 4A and 4B show head 14 and suspension 13 positioned over the data recording surface of disk 11. During times of inactivity, the head is moved into the central region 45 as shown in FIGS. 4C and 4D so that head 14 is substantially aligned with a central access 41 perpendicular to the disk surface. As the slider 14 nears the inner diameter of the disk 11, the upward force of the air flow is reduced and the slider begins to drag along region 45. Preferably, it is then "parked" at the disk center 41 as shown. The actuator assembly 12 moves the slider back onto the disk surface when necessary by applying a force to overcome the stiction between slider 14 and surface 8, as discussed previously. Since the slider is parked at disk center 41, stiction is essentially nonexistent, and very little force is required to overcome it. The slider 14 is preferably also center parked during periods when the drive is not operational. When the drive is powered on, the disk 11 spins without any significant stiction impedance. Reduced stiction translates to a reduction in starting torque required from the motor 44. Reduced starting torque in turn leads to a reduction in the electric power requirements of the drive.

As mentioned previously, the present invention allows a flatter, wider motor 44 to be used than conventional disk drives requiring hubs. It is generally understood in the art of motors that an increase in the diameter of the motor windings increases its large moment arm to generate more torque with less force. The motor thus requires less electric current to perform the same operation as a center hub motor. Since the electrical power (P) is proportional to the square of the current, a reduction in the current requirement will result in a large reduction in the electric power requirement as shown below.

(1) $P = I \times I \times R$, and (2) $I = k/D$.

Therefore, (3) $P = (k \times k \times R)/(D \times D)$, where P is the electric power of the motor, I is the electric current used by the motor, D is the motor diameter, R is the electric resistance of the motor, and k is the inversely proportional constant of the motor current to diameter. Applying the above equations, an increase of motor diameter by, for example, a factor of 3 will result in a motor that can achieve the same torque with 1/9th of the power. The motor torque is transmitted directly to the bottom surface of the disk through, for example, an adhesive or a coupling device. Examples of motors that may be used to implement the preferred embodiment include those used in the commercially sold IBM TravelStar LP (TM) or the Maxtor MobileMax Lite (TM).

Figure 5A:
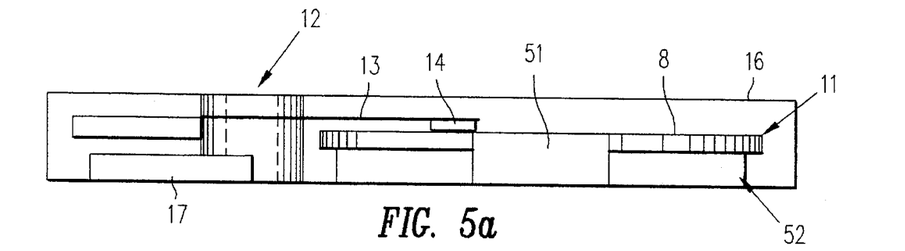
FIGS. 5A–5C are side and top views of an alternative embodiment of the present invention including a flush hub at the inner diameter for center parking.
Figure 5B:
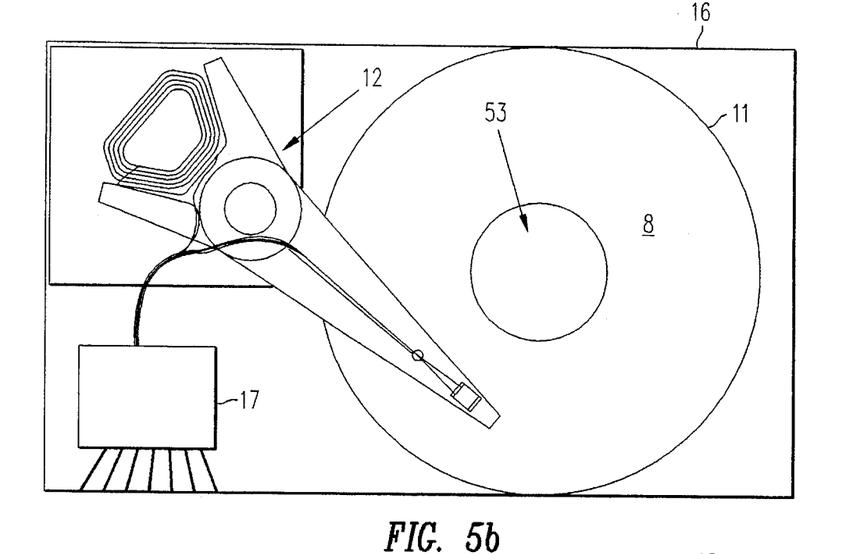
Figure 5C:
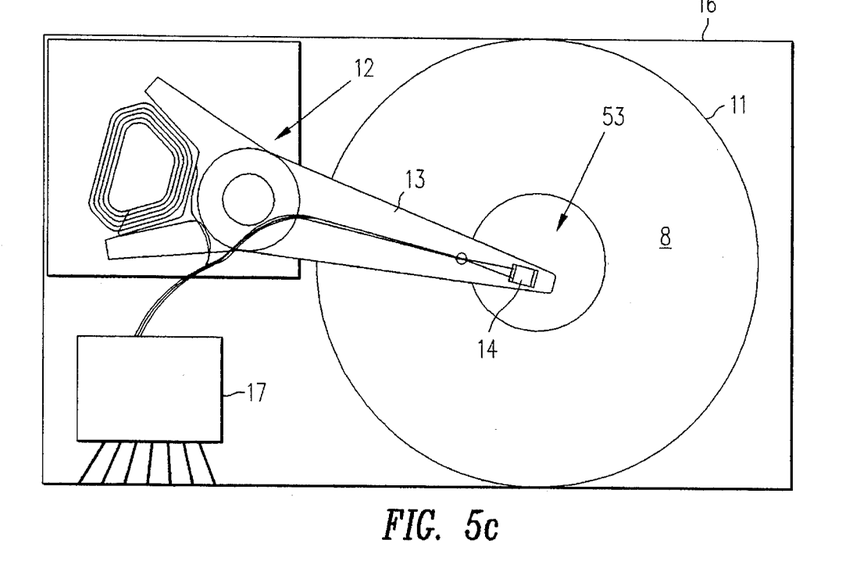

FIGS. 5A–5C show an alternative embodiment of the present invention including a rotating hub or stationary structure 51 flush with the recording surface of disk 11. For example, a ring-shaped motor 52 is directly coupled to disk 11, and an independent, stationary structure 51 is provided at the motor's center. Alternatively, a hub may enclose or rest on a motor to provide a rotating central region 53. According to either embodiment, the suspension 13 and head 14 are parked at the disk center in the same manner as described for the preferred embodiment during periods of non-operation or inactivity.

Figure 6:
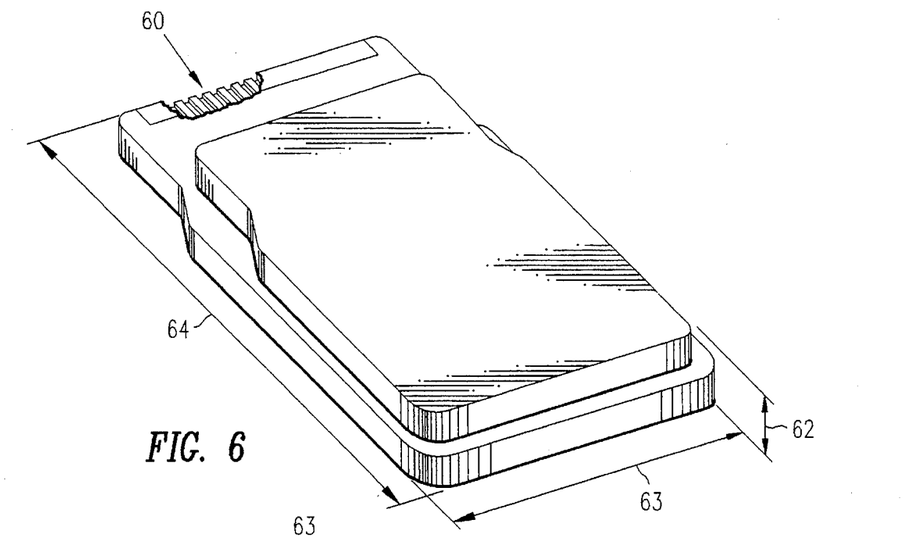
FIG. 6 is a perspective view of a known form factor card.
Figure 7:
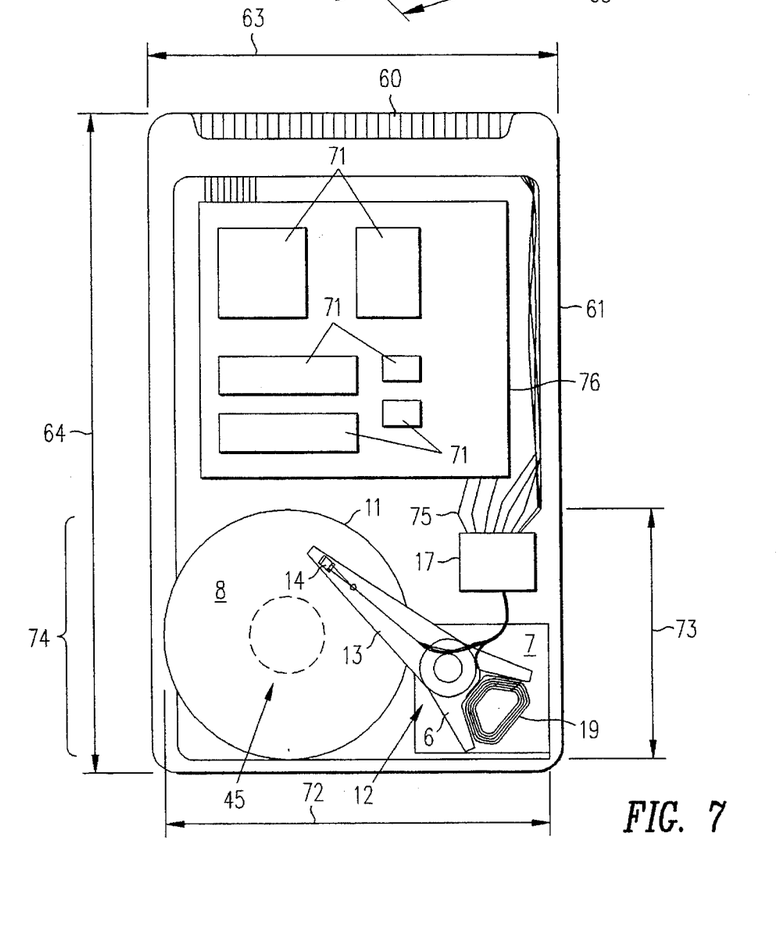
FIG. 7 is a top exposed view of the card of FIG. 6 including the preferred embodiment of the present invention and further including additional circuitry.

The preferred and alternate embodiments of the present invention are particularly suitable for card-type disk drives such as the one shown in FIG. 6. The card typically plugs into a standard computer slot along connector 64. The most critical dimension of card-type drives is their profile height, which is limited by the card thickness 62. Disk size is generally determined by the card width 63. Ideally, the drive can be made small enough to be used as a discrete storage component occupying less than the full area of the card, as shown in FIG. 7. The additional logic may or may not include storage functions.

For example, the drive can be designed to fit within less than 50% of the area of a PCMCIA type II or III card 61. At present there is no commercially available flat motor under 5 mm for a type II design. However, availability is anticipated in the near future and prototypes are currently being tested. Accordingly, the card layout will be described with reference to type II dimensions, but will be understood to apply generally to both type II and III formats.

A 1.3" disk is mounted to a small, flat motor such as the motor implemented in MobileMax Lite, a PCMCIA type II disk drive. The actuator assembly is a conventional dual-suspension design such as that used in the Hewlett Packard KITTYHAWK 1.3" drive, modified to have a single suspension and a lower profile height. Preferably, the height of the disk and motor assembly measures 5 mm. The actuator preferably also has a maximum height of 5 mm. The actuator and disk assembly preferably have an orientation such as that shown in FIG. 7, with a total length 72 not exceeding 54 mm, the width 63 of a PCMCIA Type II card 61. Alternatively, the drive is oriented such that its length 72 is parallel to the length 64 of the card. Drive width preferably ranges from a minimum of 1.3" to a maximum of 43 mm, or 50% of the length of the type II card.

Additional parking features can be added at the center regions of the preferred and alternate embodiments of the present invention. For example, in one embodiment, a nonstick material that is not prone to generate debris, e.g. steel, is applied to the center disk region 45 or 53 of either preferred embodiment to avoid any sticking of the slider and to provide shock damping. In another embodiment, the region 45 or 53 is roughened, e.g. by forming a plurality of concentric grooves. The grooves may be formed, for example, by mechanical etching or laser ablation. Alternatively, the center region 45 or 53 may be smoothed to increase stiction at the disk center, as an aid for keeping the slider parked. In yet another embodiment, the hub is made of material that softens shock on the slider 14. Special plastics, e.g. nylon, can be molded into shape for this function.

If the preferred embodiment of the present invention includes a stationary hub, it may be modified to include a slanted or wedge-shaped center region to lift up the slider as it approaches the disk surface. This implementation is a variation of a ramp for load/unload. The wedge can further be shaped to minimize contact to a certain part of the suspension or slider, as will be readily apparent to those of ordinary skill in the art.

Figure 8A:
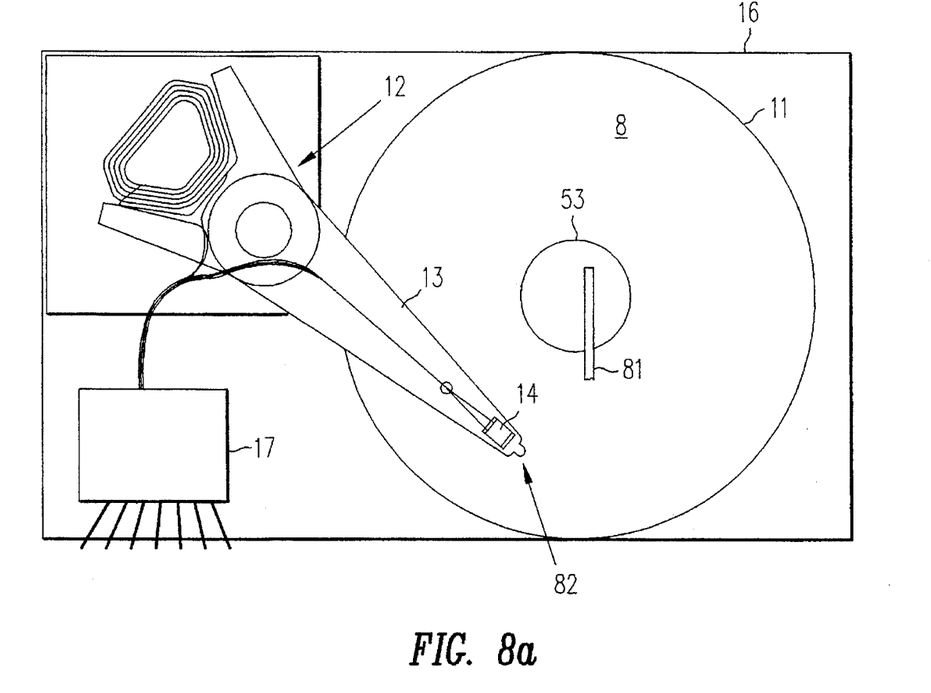
FIGS. 8A and 8B are top views of the disk drive according to the present invention including a load/unload ramp at the center hub.
Figure 8B:
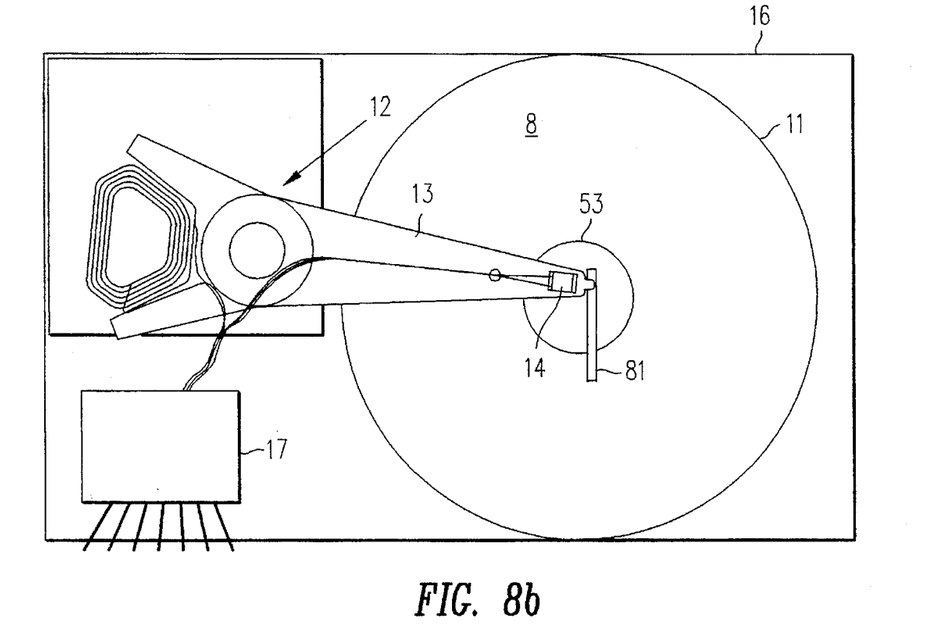

A more conventional approach is to provide a load/unload ramp 81 at the stationary center region 53 as shown in FIGS. 8A and 8B. The suspension 13 is adapted to engage the ramp 81, e.g. by adding a tab 82 at its tip. As the slider moves toward the center of the disk, its fly height is reduced because of the decreasing upward force of the air flow. The ramp 81 catches the suspension tab 82 before the slider encounters the disk surface 8. As a variation of this implementation, the ramp 81 can be rigidly affixed to the housing of the disk drive directly above the disk center. Its positioning would essentially remain the same as shown in FIGS. 8A and 8B.

Figure 9A:
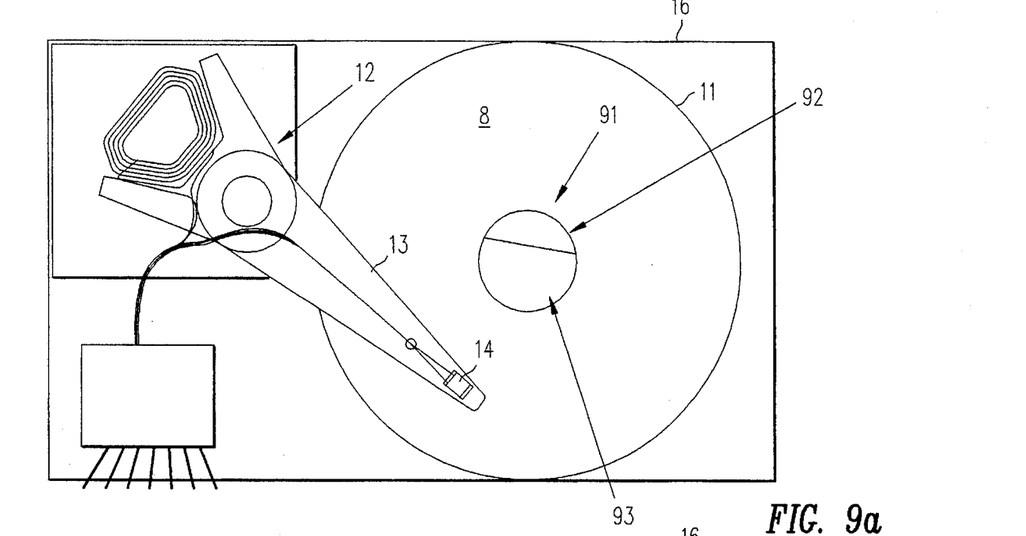
FIGS. 9A–9D are a disk drive according to the present invention including a spacer at the hub which accommodates center parking.
Figures 9B, 9C, 9D:
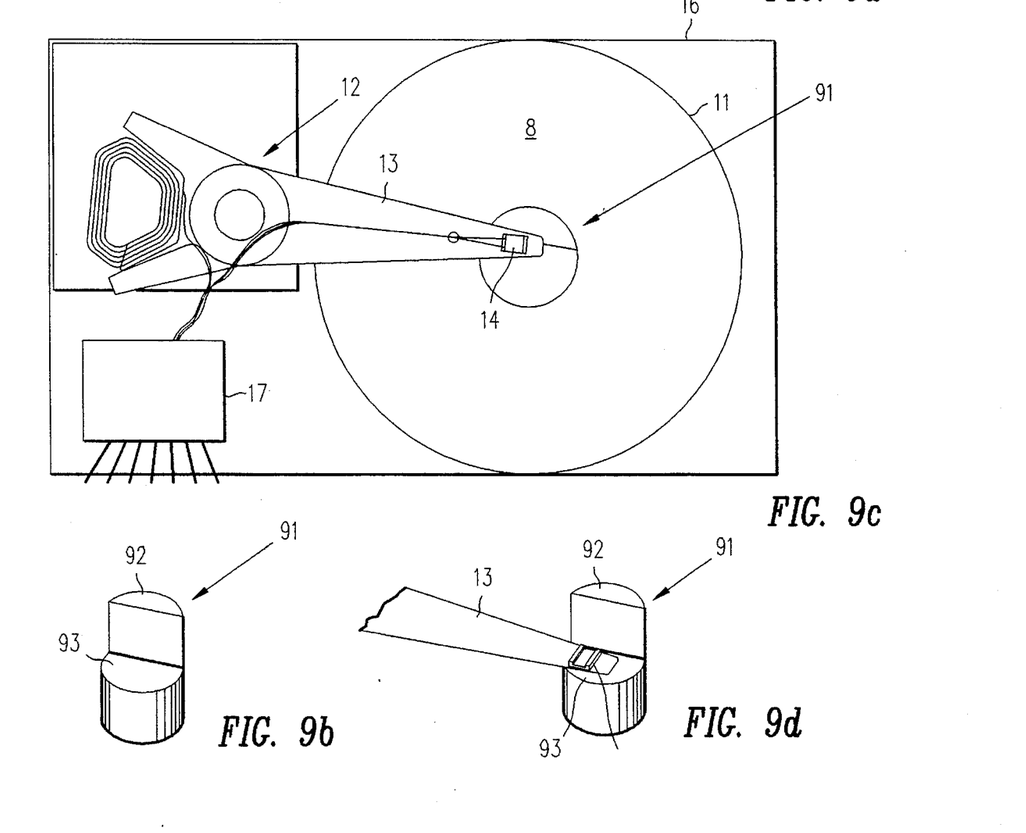
Figure 11A:
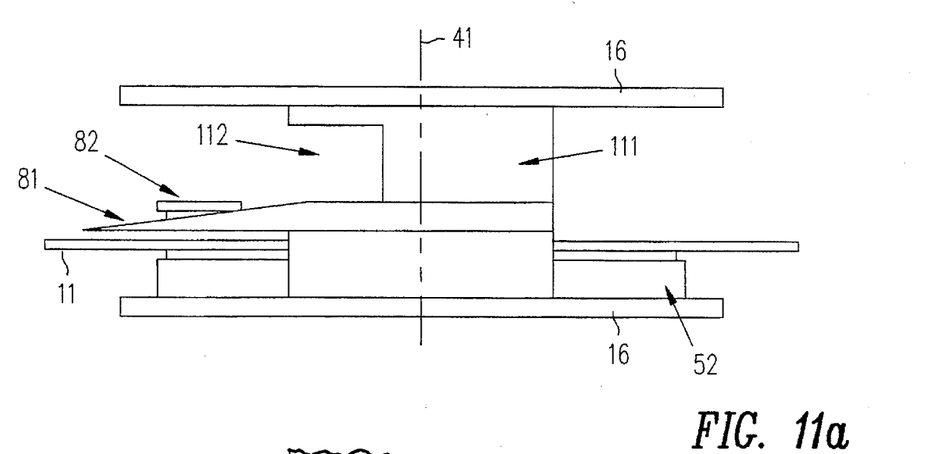
FIGS. 11A and 11B are side and top view of a disk drive according to the present invention including a hub assembly with a load/unload ramp.
Figure 11B:
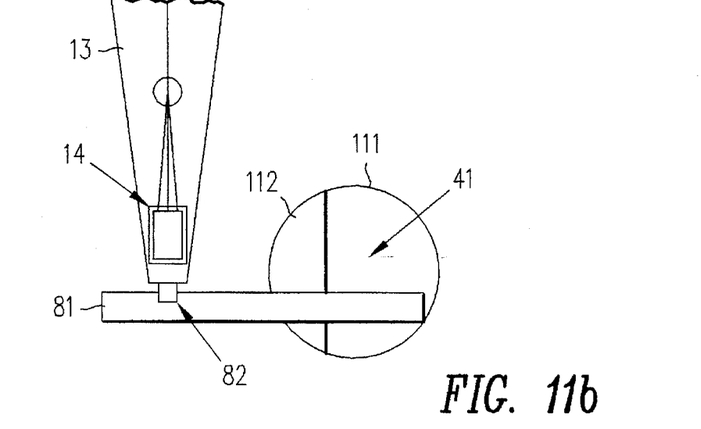

In addition to parking features, structural supports may also be added at the disk center to protect it from heavy loads external to the disk enclosure. For example, FIGS. 9A–9D show an embodiment of the present invention including a stationary center region 53, a spacer structure 91 with a landing surface 93 to accommodate center parking (see FIG. 9B). Surface 92 is near or affixed to the drive housing 16 located directly above disk center. As will be readily apparent to those of ordinary skill in disk drive design, many variations of the spacer shown in FIGS. 9B and 9D are possible. For example, FIGS. 11A and 11B show a spacer structure 111 including a load/unload ramp 81 and a cutaway section 112 for accommodating center parking. Spacers such as those shown in FIGS. 9A–9D and 11A–11B protect the actuator assembly 12 and disk surface 8 when the external housing is compacted or placed under a bending load, since the excess load is transmitted in a controlled and predictable manner to the stationary structure 51.

Figure 10:
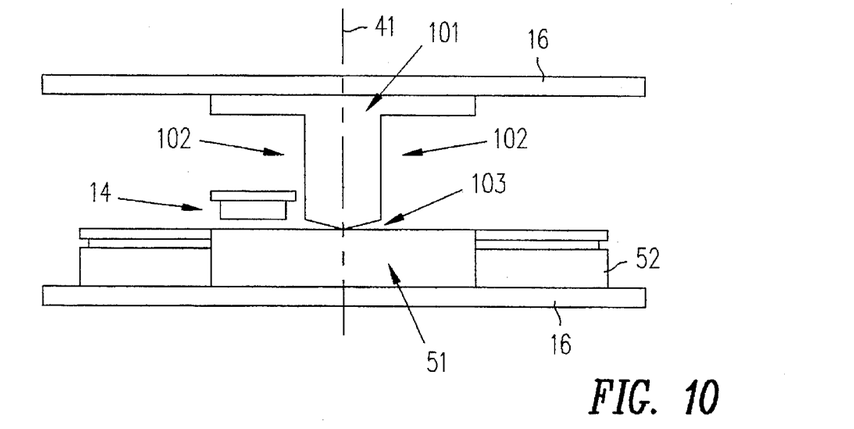
FIG. 10 is a sectional side view of a disk drive according to the present invention including a spacer suspended from the disk enclosure with a contact tip touching the disk center hub.

Yet another spacer structure made possible by the design of the present invention is the structure 101 shown in FIG. 10. The spacer 101 is suspended from the drive housing 16 above the disk 11, and is therefore suitable for embodiments of the present invention including either rotating or stationary centers. Carved out region 102 accommodates head parking proximate to the center of the disk 11. When a force is exerted on the disk housing, the spacer temporarily makes contact with the center region 45 or 53. If the disk center is rotating, the spacer is shaped at its base to include a cone, needle, or other appropriate shape to limit its area of disk contact. A conical base 103 is shown in FIG. 10.

Although the present invention has been described in terms of specific, it is to be understood that the disclosure is not to be interpreted as limited to those embodiments shown. Various further alterations and modifications will no doubt become apparent to those skilled in the art after having read the above disclosure. Moreover, the examples provided are not intended to be exhaustive, and the scope of the present invention defined by the following claims is intended to extend to all functional equivalents of the elements shown or described.

I claim:

1. A disk drive assembly, comprising:
    a disk including an upper data recording surface having a substantially coplanar region at its center with an axis of rotation of said disk passing through said coplanar region, and a lower surface;
    means disposed below said disk for rotating said disk;
    an actuator assembly including a suspension supporting a transducer, and means for selectively moving said transducer over said data recording surface and said substantially coplanar region; and
    means for parking said transducer on said substantially coplanar region.

2. The disk drive assembly of claim 1, further comprising a housing enclosing said disk, said means for rotating said disk, and said actuator assembly.

3. The disk drive assembly of claim 2, further comprising a support structure disposed between said substantially coplanar region and said housing.

4. The disk drive assembly of claim 3, wherein said support structure is disposed on said substantially coplanar region.

5. The disk drive assembly of claim 3, wherein said support structure is suspended from said housing.

6. The disk drive assembly of claim 5, wherein said support structure further comprises a conical tip proximate to said substantially coplanar region.

7. The disk drive assembly of claim 5, wherein said support structure further comprises a needlelike tip proximate to said substantially coplanar region.

8. The disk drive assembly of claim 5, wherein said parking means comprises a cavity formed in said support structure to accommodate parking of said transducer.

9. The disk drive assembly of claim 8, wherein said parking means further comprises a ramp disposed in said cavity for engaging said suspension.

10. The disk drive assembly of claim 9, wherein said suspension is adapted to engage said ramp.

11. The disk drive assembly of claim 5, wherein said parking means comprises a step formed on said support structure to accommodate parking of said transducer.

12. The disk drive assembly of claim 11, wherein said parking means further comprises a ramp disposed on said step for engaging said suspension.

13. The disk drive assembly of claim 12, wherein said suspension is adapted to engage said ramp.

14. The disk drive assembly of claim 1, wherein said means for moving said transducer further comprises a voice coil motor and actuator arm from which said suspension extends.

15. The disk drive assembly of claim 1, wherein said disk comprises a magnetic disk.

16. The disk drive assembly of claim 1, further comprising a stationary structure disposed beneath said disk, wherein a portion of said stationary structure penetrates the center of said disk and is substantially flush with the plane of said recording surface.

17. The disk drive assembly of claim 16, wherein said stationary structure further comprises a shock absorbent material.

18. The disk drive assembly of claim 16, wherein said shock absorbent material comprises nylon.

19. The disk drive assembly of claim 1, wherein said means for rotating said disk comprises a motor assembly including a hub, wherein a portion of said hub penetrates the center of said disk and is substantially flush with the plane of said recording surface.

20. The disk drive assembly of claim 19, wherein said portion of said hub comprises a shock absorbent material.

21. The disk drive assembly of claim 19, wherein said shock absorbent material comprises nylon.

22. The disk drive assembly of claim 1, wherein said rotating means comprises a motor fixedly connected to said lower surface of said disk.

23. The disk drive assembly of claim 22, wherein said motor is annular in shape.

24. The disk drive assembly of claim 1, wherein said parking means comprises a ramp disposed on said substantially coplanar region for engaging said suspension.

25. The disk drive assembly of claim 24, wherein said suspension is adapted to engage said ramp.

26. The disk drive assembly of claim 1, wherein said parking means comprises a raised portion formed on said substantially coplanar region for engaging said suspension.

27. The disk drive assembly of claim 26, wherein said raised portion is wedge-shaped.

28. The disk drive assembly of claim 27, wherein said raised portion comprises a bump.

29. The disk drive assembly of claim 1, wherein said substantially coplanar region has a textured surface.

30. The disk drive assembly of claim 29, wherein said textured surface comprises a plurality of concentric grooves.

31. The disk drive assembly of claim 1, wherein said substantially coplanar region has a smooth surface.

32. The disk drive assembly of claim 1, wherein said substantially coplanar region is coated with a nonstick material.

33. The disk drive assembly of claim 1, further comprising a support structure disposed on said substantially coplanar region.

34. The disk drive assembly of claim 33, wherein said parking means comprises a cavity formed in said support structure to accommodate parking of said transducer.

35. The disk drive assembly of claim 34, wherein said parking means further comprises a ramp disposed in said cavity for engaging said suspension.

36. The disk drive assembly of claim 35, wherein said suspension is adapted to engage said ramp.

37. The disk drive assembly of claim 36, wherein said parking means comprises a step formed on said support structure to accommodate parking of said transducer.

38. The disk drive assembly of claim 37, wherein said parking means further comprises a ramp disposed on said step for engaging said suspension.

39. The disk drive assembly of claim 38, wherein said suspension is adapted to engage said ramp.

* * * * *